J. P. GERAGHTY.
CAR FENDER.
APPLICATION FILED OCT. 28, 1916.

1,229,935.

Patented June 12, 1917.
2 SHEETS—SHEET 1.

WITNESSES

INVENTOR
John P. Geraghty
BY
ATTORNEYS

J. P. GERAGHTY.
CAR FENDER.
APPLICATION FILED OCT. 28, 1916.
1,229,935.
Patented June 12, 1917.
2 SHEETS—SHEET 2.
Fig. 3.
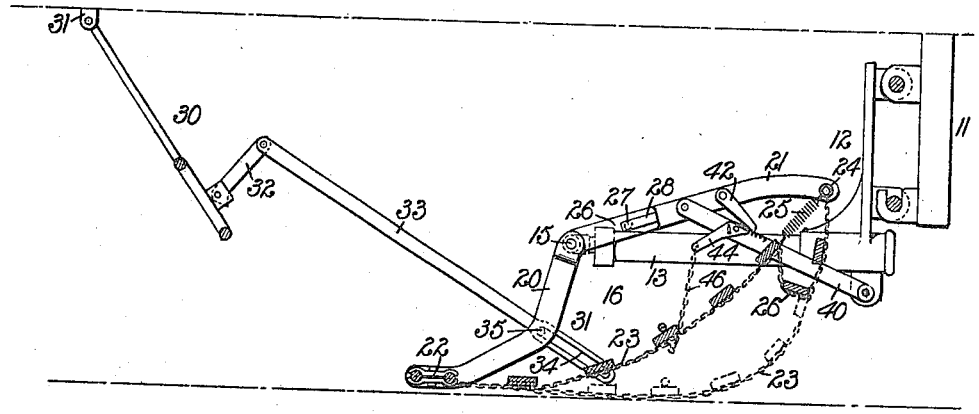
Fig. 5.
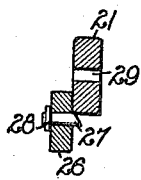
Fig. 4.
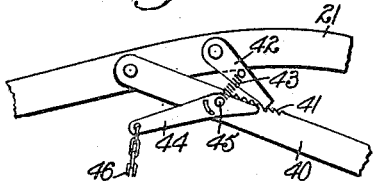
Fig. 6.
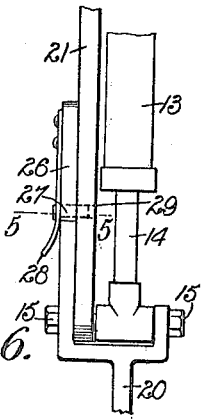
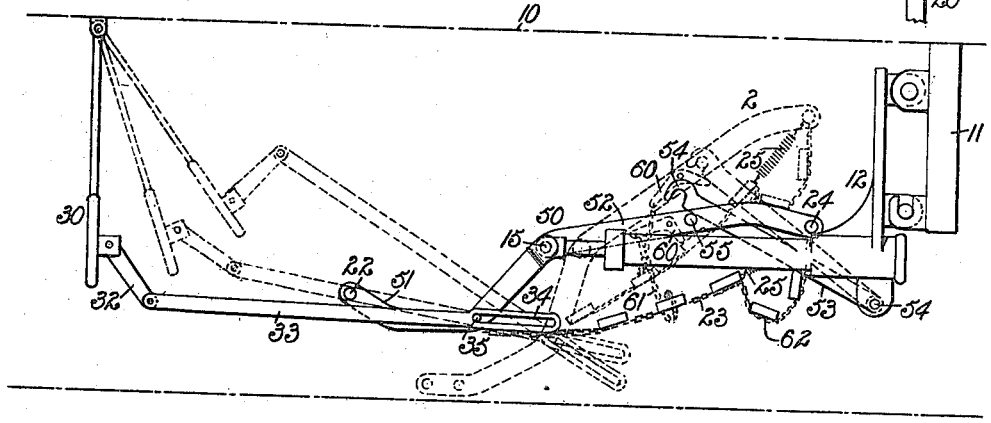
Fig. 7.
WITNESSES
INVENTOR
John P. Geraghty
BY
ATTORNEYS

UNITED STATES PATENT OFFICE.

JOHN P. GERAGHTY, OF JERSEY CITY, NEW JERSEY.

CAR-FENDER.

1,229,935.  Specification of Letters Patent.  Patented June 12, 1917.

Application filed October 28, 1916.  Serial No. 128,189.

*To all whom it may concern:*

Be it known that I, JOHN P. GERAGHTY, a citizen of the United States, and a resident of Jersey City, in the county of Hudson and State of New Jersey, have invented a new and Improved Car-Fender, of which the following is a full, clear, and exact description.

The invention relates to car fenders arranged under the car platform immediately in front of the wheels and connected with a gate at the forward end of the platform. The present invention is an improvement on car fenders such as shown and described in the Letters Patent of the United States, No. 1,090,295, granted to me and George William Naylor on March 17, 1914.

The object of the invention is to provide a new and improved car fender more especially designed for use on surface cars and arranged to normally hold the fender proper a distance above the track to clear switches, paving stones and the like, to cause the apron frame to move into lowermost receiving position on a person or other object being struck by the gate, to hold the fender proper locked in this position until the person or other object passes onto the fender proper, and to then cause the fender to return to normal raised position thus preventing such person or object from being run over or from being dragged along the track and without danger of a hand or foot being bruised or otherwise injured by the track.

In order to accomplish the desired result, use is made of a gate at the front end of the car, a fender proper arranged a distance in the rear of the said gate and normally in a raised position relative to the track, said fender being connected with the said gate and adapted to move simultaneously with the latter, and the said fender being mounted to move into receiving position with the front end of the fender in close proximity to the track at the time the gate strikes an obstruction during the forward motion of the car, and locking means for the said fender and controlled by the latter, said locking means locking the fender in lowermost position until the weight of the obstruction on the fender releases the said locking means and causes the fender to return to raised position.

A practical embodiment of the invention is represented in the accompanying drawings forming a part of this specification, in which similar characters of reference indicate corresponding parts in all the views.

Fig. 3 is a similar view of the same with the parts in position after the gate has struck an obstruction on the track;

Fig. 4 is an enlarged side elevation of a portion of the locking device for the fender frame;

Fig. 5 is an enlarged cross section of the fender frame sections in normal disconnected position, the section being on the line 5—5 of Fig. 6;

Fig. 6 is a plan view of the same; and

Fig. 7 is a side elevation of a modified form of the car fender.

Figure 2:
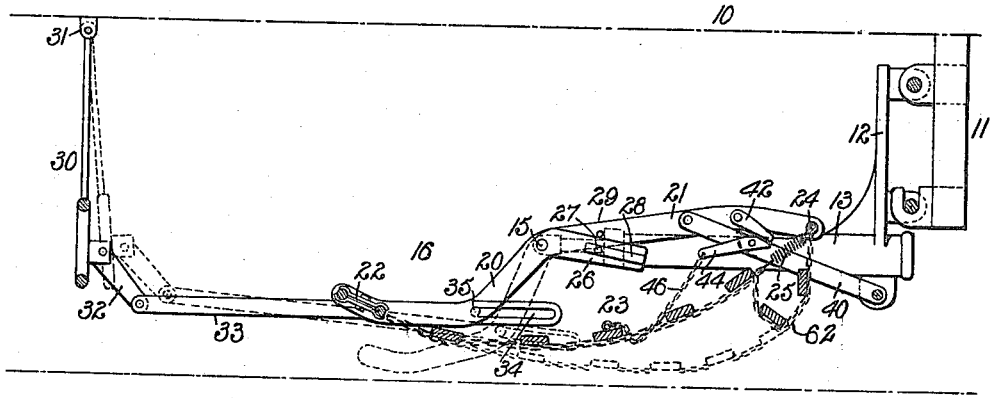
Fig. 2 is a sectional side elevation of the same as applied.

On the under side of the car body 10 are attached depending hangers 11 located immediately in the front of the car wheels, and on the said hangers 11 is mounted a fender support 12 provided at the sides with horizontally extending tubular guideways 13 in which are mounted to slide rearward and forward rods 14 provided at their forward ends with transverse pivots 15 on which the fender proper 16 is mounted to swing, as hereinafter more fully explained. The fender proper 16 consists essentially of a fender frame and an apron, of which the fender frame is formed of a front section 20 and a rear section 21, both sections 20, 21 being mounted to swing independent one of the other on the pivots 15. The front frame section 20 is provided with front crossbars 22 to which is secured the front end of the apron 23, preferably in the form of a slat belt and attached at its rear end to a crossbar 24 forming part of the rear frame section 21. Springs 25 are attached to the crossbar 24 and are connected with the apron 23 a distance forward of the rear end thereof so that the rear portion 62 of the apron 23 is normally slack, as plainly indicated in Fig. 2, but becomes active when an obstruction falls into the apron 23 and stretches the springs 25 until the portion 62 becomes taut, as indicated in dotted lines in Fig. 3.

The front frame section 20 is provided with rearwardly extending arms 26 each provided with a transversely extending latch bolt 27 (see Figs. 5 and 6) pressed on by a spring 28 and adapted to engage an aperture 29 formed in the corresponding side member of the rear fender section 21 to lock the sections 20 and 21 together, as shown in Fig. 3. Normally the sections 20 and 21 are disconnected, that is, are mounted to swing independently of each other on the pivots 15 but when the section 20 is swung downward from its normal raised position then the spring presses the bolt 27 to finally engage the aperture 29 thus locking the sections 20 and 21 together to cause the section 21 to move with the section 20.

Figure 1:
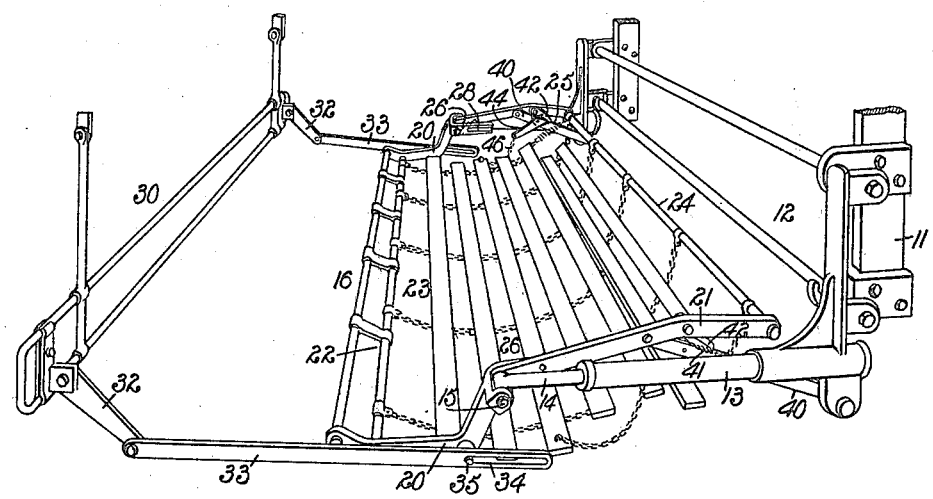
Figure 1 is a perspective view of the car fender.

The front frame section 20 is controlled from a gate 30 fulcrumed at its upper end on brackets 31 attached to the under side of the car body 10 at the front end thereof. The gate 30 is pivotally connected by short links 32 with links 33 extending rearwardly and provided at their rear ends with lengthwise extending slots 34 into which project pins 35 forming part of the side members of the front frame section 20. When the fender 16 is in normal position and the gate 30 hangs vertically, as shown in Figs. 1 and 2, then the pins 35 are in the front ends of the slots 34 of the links 33 and when the gate 30 strikes an obstruction at the time the car moves forward then the gate 30 swings rearwardly and in doing so the links 33 impart a downward swinging movement to the front frame section 20 whereby the front crossbars 22 are moved in close proximity to the track and the extension arms 26 of the front frame section 20 is locked to the rear frame section 21 by the bolts 27 engaging the apertures 29 as previously explained. On the further forward movement of the car the gate 30 is swung farther rearward and in doing so the link 33 acting on the pins 35 push the fender 16 bodily rearward with the rods 14 sliding in guideways 13 (see Fig. 3). When this position is reached the links 32 and 33 are approximately in right angle position one relative to the other to permit the gate 30 to swing farther upwardly and rearwardly to allow the obstruction to pass under the gate, it being understood that during this final upward movement of the gate 30 the link 33 slides upward and forward with the pins 31 traveling in the slots 34 so that the links 33 do not affect the lowermost position of the fender 16.

In order to lock the fender 16 in lowermost position until the obstacle has passed onto the apron 23, the following arrangement is made: The rear frame section 21 is pivotally connected at each side by a link 40 with the support 13, and the top of the link 40 is provided near its forward end with ratchet teeth 41 adapted to be engaged by a pawl 42 fulcrumed on the rear frame section 21 and pressed on by a spring 43. When the frame section 21 swings upward with the section 20 at the time the latter reaches lowermost position then the pawl 42 engages one of the ratchet teeth 41 and thus locks the rear frame section 21 to the link 40 thereby preventing return movement of the rear frame section 21. The pawl 22 is adapted to be engaged by a tripping lever 44 fulcrumed at 45 on the link 40 and the said tripping lever 44 is pivotally connected by a chain or other flexible connection 46 with the apron 23 at or near the middle thereof so that when an obstruction falls into the apron 23 and presses the same downward then the chain 46 imparts a swinging movement to the tripping lever 44 whereby the pawl 42 is lifted out of engagement with the corresponding ratchet tooth 41. When this takes place the fender 16 becomes unlocked and is free to swing back into its original position by the preponderance of the weight of the obstruction in the rear portion of the apron 23, that is, rearwardly of the pivots 15. It will be noticed that when the rear frame 20 swings downward the links 40 exert a forward push to the section 21 thus moving the entire fender 16 bodily forward with the rods 14 sliding forwardly in the guideways 13. Thus when the obstruction falls into the apron the fender is returned to its uppermost position thus holding the obstruction safely in the apron and a distance above the track to prevent the obstruction from being injured.

In the modified form shown in Fig. 7 the apron frame 50 is made solid throughout its length, that is, the front and rear portions 51 and 52 are integral so that the rear section 52 swings upward at the time the front section 51 swings downward. In order to lock the apron frame in lowermost position for the time being, use is made of a link 53 pivoted at 54 on the support 12, and the forward end of the link 53 terminates in a hook 54 adapted to engage a pin 55 attached to the rear portion 52 of the fender frame 50 at the time the fender frame is swung into a receiving position, as shown in dotted lines in Fig. 7. The link 53 is adapted to be swung out of engagement with the pin 15 by the use of a tripping lever 60 fulcrumed on the rear portion 52 of the fender frame 50 and connected by a chain 61 with the apron 23 at or near the middle thereof, the same as the tripping lever 44 is connected by the chain 46 with the apron 23. When the obstacle falls into the apron 23 the chain 61 imparts a swinging motion to the tripping lever 60 whereby the latter swings the hook 54 of the link 53 out of engagement with the pin 55 thereby releasing the fender frame 50 and allowing the same to swing back into uppermost position the same as above described in reference to the fender illustrated in Figs. 1, 2 and 3. The remaining parts of the fender shown in Fig. 7 are the same as above described in reference to the fender shown in Figs. 1, 2 and 3, and hence further description of the same is not deemed necessary.

It is understood that by the arrangement described the fender 16 moves simultaneously with the gate 30 so that the fender swings into an inclined receiving position prior to the obstruction reaching the front end of the fender without danger of a foot or a hand being caught under the forward end of the fender. When the object passes onto the apron 23 then the weight of the part causes an unlocking of the fender and a return of the latter to normal uppermost position with the parts safely supported thereon.

Having thus described my invention, I claim as new and desire to secure by Letters Patent:—

1. A car fender, comprising a gate at the front end of the car, a fender proper arranged a distance in the rear of the said gate and normally in a raised position relative to the track, the said fender being connected with the said gate and adapted to move simultaneously with the latter and the said fender being mounted to move into receiving position with the front end of the fender in close proximity to the track when the gate strikes an obstruction during the forward motion of the car, and locking means for the said fender and controlled by the latter, the said locking means locking the fender in lowermost position until the weight of the obstruction on the fender releases the said locking means and causes the fender to return to raised position.

2. A car fender, comprising a gate at the front end of the car, a fender proper arranged a distance in the rear of the said gate and normally in a raised position relative to the track, the said fender having a fender frame and a flexible apron mounted on the frame, the said fender frame being mounted to swing up and down and to slide bodily in a longitudinal direction, the said fender frame being pivotally connected with the said gate and adapted to move simultaneously with the latter when the gate strikes an obstruction during the forward movement of the car, and a locking device controlled from the said fender apron and adapted to engage the said fender frame to lock the fender frame when in lowermost position until the weight of the obstruction on the fender apron releases the said locking device and causes the fender to return to normal raised position.

3. A car fender, comprising a gate suspended from the front end of the car and mounted to swing rearwardly, a fender proper arranged a distance in the rear of the said gate and mounted to swing up and down and to slide bodily in a longitudinal direction, and a link connection pivotally connected with the said gate and having a limited sliding connection with the said apron to impart a downward swinging motion to the apron when the gate strikes an obstruction during the forward movement of the car and to then move the fender bodily rearward, the said gate then being free to swing into final uppermost position independent of the fender.

4. A car fender, comprising a gate suspended from the front end of the car and mounted to swing rearwardly, a fender proper arranged a distance in the rear of the said gate and mounted to swing up and down and to slide bodily in a longitudinal direction, a link connection pivotally connected with the said gate and having a limited sliding connection with the said apron to impart a downward swinging motion to the apron when the gate strikes an obstruction during the forward movement of the car and to then move the fender bodily rearward, the said gate then being free to swing into final uppermost position independent of the fender, a locking device adapted to lock the said fender when in rearmost receiving position, and a releasing device mounted on the said fender and adapted to unlock the said locking device to allow the fender to return to normal uppermost position.

5. A car fender, comprising a gate suspended from the front end of the car and mounted to swing rearwardly and upwardly, a fender proper arranged a distance in the rear of the said gate and normally in a raised position relative to the track, the said fender having a fender frame and a flexible apron mounted on the said fender frame, the latter being made in a front section and a rear section, the frame sections being mounted to swing on a common center and the front section being pivotally connected with the said fender to impart a downward swinging motion to the said forward frame section when the gate strikes an obstruction during the forward movement of the car, and means to lock the said frame sections together at the time the front frame section is swung into lowermost position.

6. A car fender, comprising a gate suspended from the front end of the car and mounted to swing rearwardly and upwardly, a fender proper arranged a distance in the rear of the said gate and normally in a raised position relative to the track, the said fender having a fender frame, a flexible apron mounted on the said fender frame, the latter being made in a front section and a rear section, the frame sections being mounted to swing on a common center, and the front section being pivotally connected with the said fender to impart a downward swinging motion to the said forward frame section when the gate strikes an obstruction during the forward movement of the car, means to lock the said frame sections together at the time the front frame section is swung into lowermost position, a link pivoted at its rear end on a fixed part and pivotally connected at its forward end with the said rear fender frame section, and releasing means mounted on the said rear frame section and controlled by the said apron to release the said link relative to the rear fender frame section.

7. A car fender, comprising a gate suspended from the front end of the car and mounted to swing rearwardly and upwardly, a fender proper arranged a distance in the rear of the said gate and normally in a raised position relative to the track, the said fender having a fender frame and a flexible apron mounted on the said fender frame, the latter being made in a front section and a rear section, the frame sections being mounted to swing on a common center and the front section being pivotally connected with the said fender to impart a downward swinging motion to the said forward frame section when the gate strikes an obstruction during the forward movement of the car, means to lock the said frame sections together at the time the front frame section is swung into lowermost position, a link pivoted at its rear end on a fixed part and pivotally connected at its forward end with the said rear frame section, the said link having ratchet teeth, a pawl fulcrumed on the said rear frame section and adapted to engage the said ratchet teeth, a tripping lever fulcrumed on the rear frame section and adapted to lift the said pawl out of engagement with the said ratchet teeth, and a connection between the said tripping lever and the said apron.

8. A car fender provided with a fender proper comprising a fender frame, a flexible apron connected at its ends with the front and rear ends of the said frame, and springs held on the rear end of the said frame and connected with the said apron a distance forward of the rear end of the apron to provide a slack rear portion of the apron.

JOHN P. GERAGHTY.

Copies of this patent may be obtained for five cents each, by addressing the "Commissioner of Patents, Washington, D. C."